United States Patent
Kim et al.

(10) Patent No.: US 10,970,931 B2
(45) Date of Patent: Apr. 6, 2021

(54) METHOD FOR TRANSMITTING VIRTUAL REALITY IMAGE CREATED BASED ON IMAGE DIRECTION DATA, AND COMPUTER READABLE MEDIUM STORING PROGRAM USING THE SAME

(71) Applicant: CLICKED INC., Seoul (KR)

(72) Inventors: Tae Wook Kim, Seoul (KR); Ha Ram Lee, Seoul (KR); Duk Young Jung, Seoul (KR)

(73) Assignee: CLICKED INC., Seoul (KR)

( * ) Notice: Subject to any disclaimer, the term of this patent is extended or adjusted under 35 U.S.C. 154(b) by 0 days.

(21) Appl. No.: 15/908,924

(22) Filed: Mar. 1, 2018

(65) Prior Publication Data

US 2018/0190036 A1 Jul. 5, 2018

Related U.S. Application Data (63) Continuation of application No. PCT/KR2016/009588, filed on Aug. 29, 2016.

(30) Foreign Application Priority Data

Sep. 8, 2015 (KR) .......................... 10-2015-0127171

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/012* (2013.01); *G06T 7/254* (2017.01);
(Continued)

(58) Field of Classification Search
CPC ....... G06T 7/254; G06T 19/00; G06T 19/006; G06F 3/011; G06F 3/02; H04N 5/93; H04N 13/00
(Continued)

(56) References Cited

U.S. PATENT DOCUMENTS

2010/0103075 A1* 4/2010 Kalaboukis ............. A63F 13/02
345/8
2013/0249947 A1 9/2013 Reitan
(Continued)

FOREIGN PATENT DOCUMENTS

CN 104062759 A 9/2014
EP 2 613 296 A1 7/2013
(Continued)

OTHER PUBLICATIONS

The partial supplementary European search report issued by the European Patent Office dated Jul. 24, 2018, which corresponds to European Patent Application No. 16844615.1-1216 and is related to U.S. Appl. No. 15/908,924.
(Continued)

*Primary Examiner* — King Y Poon
*Assistant Examiner* — Vincent Peren
(74) *Attorney, Agent, or Firm* — Studebaker & Brackett PC (57) ABSTRACT

Disclosed are a method for transmitting a virtual reality image, a method for reproducing a virtual reality image, and a program using the same. A method for transmitting a virtual reality image includes an operation (S120) of creating an initial image frame by a server, an operation (S140) of determining image direction data corresponding to the initial image frame, an operation (S160) of creating a final image frame by coupling the image direction data to the initial image frame as meta information; and an operation
(Continued)

(S180) of transmitting the final image frame to a client through wireless communication.

8 Claims, 8 Drawing Sheets

(51) Int. Cl.
*G06T 7/254* (2017.01)
*H04N 13/00* (2018.01)
*H04N 5/93* (2006.01)

(52) U.S. Cl.
CPC .............. *G06T 19/00* (2013.01); *H04N 5/93* (2013.01); *H04N 13/00* (2013.01)

(58) Field of Classification Search
USPC .......................................... 345/633
See application file for complete search history.

(56) References Cited

U.S. PATENT DOCUMENTS

| | | | |
|---|---|---|---|
| 2014/0285521 A1 | 9/2014 | Kimura | |
| 2015/0145889 A1* | 5/2015 | Hanai | H04N 5/2621 345/633 |
| 2015/0379772 A1* | 12/2015 | Hoffman | G06T 19/006 345/633 |
| 2016/0189429 A1* | 6/2016 | Mallinson | G02B 26/10 345/633 |
| 2016/0219325 A1* | 7/2016 | Chu | A63F 13/35 |
| 2016/0246061 A1* | 8/2016 | Bickerstaff | G06F 3/012 |
| 2016/0337630 A1* | 11/2016 | Raghoebardajal | H04N 5/23238 |
| 2016/0366392 A1* | 12/2016 | Raghoebardajal ... | H04N 19/132 |
| 2017/0019504 A1* | 1/2017 | Ota | H04N 21/2187 |

FOREIGN PATENT DOCUMENTS

| | | |
|---|---|---|
| GB | 2 512 404 A | 10/2014 |
| JP | 2001-076168 A | 3/2001 |
| JP | 2012-048597 A | 3/2012 |
| JP | 2014-165841 A | 9/2014 |
| KR | 10-2014-0010616 A | 1/2014 |
| WO | 2013/187129 A1 | 12/2013 |
| WO | 2015/027105 A | 2/2015 |

OTHER PUBLICATIONS

The extended European search report issued by the European Patent Office dated Oct. 10, 2018, which corresponds to European Patent Application No. 16844615.1-1216 and is related to U.S. Appl. No. 15/908,924.
Michael Antonov, "AsynchronousTimewarp Examined", Developers Blog, Mar. 3, 2015, pp. 1-11, XP055344740, URL:https://developer3.oculus.com/blog/asynchronous-timewarp-examined/.
An Office Action mailed by the Korean Intellectual Property Office dated Mar. 31, 2017, which corresponds to Korean Patent Application No. 10-2017-0028073 and is related to U.S. Appl. No. 15/908,924; with English translation.
An Office Action mailed by the State Intellectual Property Office of the People's Republic of China dated Nov. 23, 2018, which corresponds to Chinese Patent Application No. 201610803452.2 and is related to U.S. Appl. No. 15/908,924; with English translation.
International Search Report; issued in PCT/KR2016/009588; dated Nov. 22, 2016.
An Office Action; "Notice of Allowance," issued by the Korean Intellectual Property Office dated Feb. 8, 2017, which corresponds to Korean Patent Application No. 10-2015-0127171.
An Office Action; "Notice of Allowance," issued by the Korean Intellectual Property Office dated Oct. 12, 2017, which corresponds to Korean Patent Application No. 10-2017-0028073.
An Office Action mailed by the Japanese Patent Office dated Mar. 26, 2019, which corresponds to Japanese Patent Application No. 2018-53276 and is related to U.S. Appl. No. 15/908,924.

* cited by examiner

Normal

First final image frame

First time point

Second final image frame

Second time point

Third final image frame

Third time point

FIG. 8

Second frame loss

First final
image frame

First time point

Second final
image frame

Second time point

Third final
image frame

Third time point

METHOD FOR TRANSMITTING VIRTUAL REALITY IMAGE CREATED BASED ON IMAGE DIRECTION DATA, AND COMPUTER READABLE MEDIUM STORING PROGRAM USING THE SAME

CROSS-REFERENCE TO RELATED APPLICATIONS

The present application is a continuation of International Patent Application No. PCT/KR2016/009588, filed Aug. 29, 2016, which is based upon and claims the benefit of priority to Korean Patent Application No. 10-2015-0127171, filed on Sep. 8, 2015. The disclosures of the above-listed applications are hereby incorporated by reference herein in their entirety.

BACKGROUND

Embodiments of the inventive concept described herein relate to a method for transmitting a virtual reality image, a method for reproducing a virtual reality image, and a program using the same, and more particularly, relate to a method or a program for transmitting virtual reality contents that require a high specification in real time through wireless communication to reproduce the virtual reality contents.

A virtual reality is a virtual space created by a computer, and is a space that gives a reality through a 3-dimensional virtual effect. The technology for realizing a virtual reality is a technology of processing an input of the user in real time so that the user may feel as if he or she was in a reality world, and is a next-generation technology that passes over multimedia.

The virtual reality environment provides the user with a realistic feeling of immersion not only to simulate an actually present object but also to allow the user to experience an object or a situation that is not actually present. The virtual reality environment may be applied to various fields. For example, the virtual reality environment has been used in very various fields, such as medical fields and culture content fields, including engineering fields, such as design of vehicles or simulation experiments.

The term virtual reality (VR) is used together with the terms, such as virtual environment, virtual presence, artificial world, virtual world, and cyberspace, and generally is a technology of allowing the user to feel an artificial experience by providing the user of a 3-dimensional virtual world that is similar to a real world created by a computer and providing an input means, through which the user may freely manipulate the virtual world in real time and a sensory feedback means that provides an actual sensor in response to the manipulation of the user.

SUMMARY

In recent years, thanks to the development of technologies, a lot of devices that may use virtual reality contents have appeared. Conventionally, the user wears a VR reproduction device to use the VR reproduction device while the VR reproduction device is connected to a personal computer (PC) such as a desktop computer through a cable to create a virtual reality image of a high specification. However, in this case, the radius of action, by which the user may move while wearing the VR device, is restricted by the cable, and an accident in which the user is caught by the cable and falls down while not identifying the external environment due to the VR device may occur. Further, only when the PC is present, a virtual reality image may be enjoyed by using the VR device.

Further, in recent years, a scheme of coupling a mobile terminal to a VR device and delivering information for creating a VR image after processing the information by the mobile terminal has been used. In the scheme, although the mobile terminal that is a computer for processing information and the VR device for reproducing the information are connected to each other by wire, the problems caused by a cable do not occur as the mobile terminal is coupled to the VR device. However, because it is difficult for the mobile terminal to drive a program of a high specification as compared with a PC, it is difficult to drive a VR game of a high specification or reproduce a VR image of a high resolution.

Accordingly, the inventive concept provides a method for transmitting a virtual reality image, a method for reproducing a virtual reality image, and a program using the same, by which a VR image may be provided from a computer of a high specification while places and the radii of action are not restricted, by transmitting an image frame through wireless communication between an information processing device and a VR device to reproduce the information.

In accordance with an aspect of the inventive concept, there is provided a method for transmitting a virtual reality image, the method including acquiring an initial image frame by a server, determining image direction data corresponding to the initial image frame, creating a final image frame by coupling the image direction data to the initial image frame as meta information, and transmitting the final image frame to a client through wireless communication, wherein the client is a device that reproduces the final image frame corresponding to a virtual reality image, and wherein the image direction data is data on a direction in a 3-dimensional space of the image frame created by the sever.

The method may further include receiving reproduction direction data from the client, the image direction data may be determined based on the received reproduction direction data in the determining of the image direction data, the client may obtain the reproduction direction data by measuring a motion of the head of a user, and the reproduction direction data may be data on a direction of an image frame that is to be reproduced on a screen of the client at a specific time point.

In accordance with another aspect of the inventive concept, there is provided a method for transmitting a virtual reality image, the method including obtaining an initial entire image at a specific time point by a server, receiving reproduction direction data from a client, extracting an initial image frame corresponding to the reproduction direction data from the initial entire image, determining the reproduction direction data as image direction data and creating a final image frame by coupling the image direction data to the initial image frame as meta information, and transmitting the final image frame to a client through wireless communication, the client may be a device that obtains the reproduction direction data by measuring a motion of the head of a user and reproduces the final image frame corresponding to a virtual reality image, the image direction data may be data on a direction in a 3-dimensional space of an image frame created by the sever, and the reproduction direction data may be data on a direction of an image frame that is to be reproduced on a screen of the client at a specific time point.

When a final image frame at a second time point is not received, the client may calculate a difference between the image direction data of a first time point and the reproduction direction data at the second time data and may correct the final image frame at the first time point based on the difference, and the second time point may be a time point after a transmission cycle of the final image frame from the first time point.

The creating of the final image frame may include converting the final image frame into image frames for respective eyeballs, and converting a size of the final image frame to a size that agrees with a screen of the client.

In accordance with another aspect of the inventive concept, there is provided a method for reproducing a virtual reality image, the method including receiving a first final image frame corresponding to a first time point from a server by a client, when a second final image frame corresponding to a second time point is not received, comparing image direction data corresponding to the first time point and reproduction direction data corresponding to the second time point and calculating a difference between the image direction data and the reproduction direction data, creating a second alternative image frame that replaces the second final image frame which has not been received by correcting the first final image frame by the calculated difference, and displaying the second alternative image frame on a screen, and the image direction data may be data on a direction in a 3-dimensional space of an image frame created by the sever, the reproduction direction data may be data on a direction of an image frame that is to be reproduced on a screen of the client, the final image frame may be an image frame including the image direction data as meta information by the server, and the second time point may be a time point after a transmission cycle of the final image frame from the first time point.

The creating of the second alternative image frame may include moving or converting the first final image frame based on the difference.

The reproduction direction data and the image direction data may include high/low angle data and azimuth angle data, and the calculating of the difference may include calculating differences between high/low angles and azimuth angles of the reproduction direction data at the second time point and the image direction data at the first time point.

The reproduction direction data and the image direction data may include inclination data that corresponds to a rotation angle about a front direction of a wearer, and the creating of the second alternative image frame may include rotating and correcting the first final image frame based on a difference between the inclination data of the reproduction direction data at the second time point and the image direction data at the first time point.

The method may further include when a final image frame corresponding to an n-th time point (n is a natural number that is greater than 2) is not received, comparing image direction data corresponding to an (n−1)-th time point and reproduction direction data corresponding to the n-th time point to calculate the difference, and creating an n-th alternative image frame by correcting an (n−1)-th alternative image frame by the calculated difference.

In accordance with another aspect of the inventive concept, there is provided a program for reproducing a virtual reality image that is coupled to a computer that is a piece of hardware and stored in a medium to execute the method.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, exemplary embodiments of the inventive concept will be described in detail with reference to the accompanying drawings. The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

Hereinafter, a virtual reality image transmitting/receiving system according to various embodiments of the inventive concept will be described with reference to the accompanying drawings.

Figure 1:
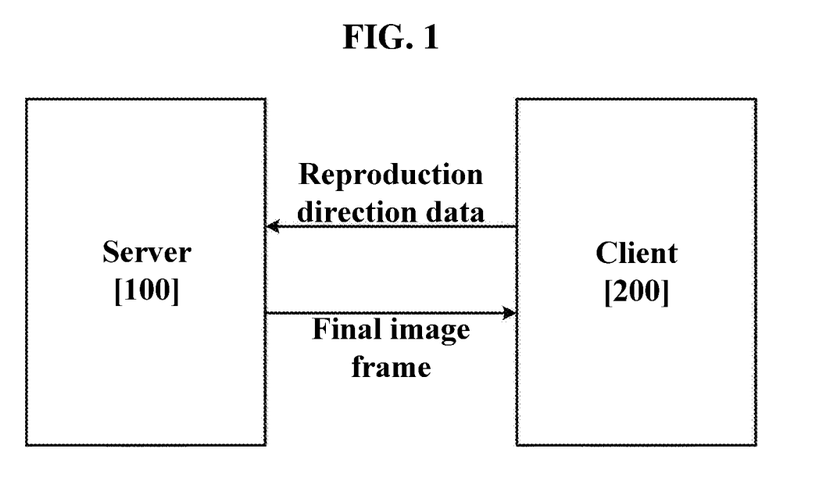
FIG. 1 is a diagram of a virtual reality image transmitting/receiving system according to an embodiment of the inventive concept.

FIG. 1 is a diagram of a virtual reality image transmitting/receiving system according to an embodiment of the inventive concept.

The virtual reality image transmitting/receiving system according to an embodiment of the inventive concept includes a server 100 and a client 200.

The server 100 is a computer that creates a virtual reality (VR) image. The server 100 functions to process information and create a VR image that is to be provided to the client 200. For example, when the VR image is an image according to driving of a specific game, the server 100 may create a suitable image frame by driving a game program and transmit the created image frame to the client 200 through wireless communication.

Further, the server 100 may function to couple image direction data to the created VR image as meta information. The image direction data may be data on a direction in a 3-dimensional space of the image frame created by the server 100.

Further, the server 100 may receive reproduction direction data from the client 200. The server 100 may determine image direction data that is to be coupled to the image frame as the received reproduction direction data, and may create a VR image frame corresponding to the reproduction direction data (or the image direction data).

The client 200 is a device that receives and reproduces an image frame (that is, a final image frame that will be described below) corresponding to a virtual reality image. That is, the client 200 functions to reproduce the VR image frame received from the server 100 and provide the reproduced VR image frame to the wearer. The client 200 may directly correspond to the VR device, and may corresponding to a form in which a mobile terminal is coupled to the VR device. For example, when the VR device and the mobile terminal are coupled to each other to form the client, the mobile terminal may receive the created image frame from the server 100 and deliver the image frame to the VR device through a wired cable connected to the mobile terminal or short range wireless communication to display the delivered image frame on a screen.

The VR device may be constituted in various forms. For example, the VR device may display an image frame including images that are suitable for both eyes in one display unit, and may create a 3-dimensional image with fisheye lenses in the directions of the eyeballs. Further, in another embodiment, the VR device may include two display units that provide images that agree with the eyeballs, respectively.

Further, the client 200 may function to measure reproduction direction data. The reproduction direction data may be data on a direction of an image frame that is to be reproduced on a screen of the client 200 at a specific time point. That is, the wearer may measure a direction which the wearer faces while wearing the client 200 on the eyeballs, and may determine the direction as the reproduction direction data. For example, the reproduction direction data may include high/low angle data, azimuth angle data, or inclination data. The client 200 may include one or more sensors (for example, a gyro sensor, an acceleration sensor, and a geomagnetic sensor), and may obtain high/low angle data, azimuth angle data, inclination data, and the like by measuring a motion of the head (or the neck) of the user who wears the client 200. Further, the client 200 may function to transmit the measured reproduction direction data to the server 100 through wireless communication.

The high/low angle data may refer to an angle formed by a horizontal plane (for example, a horizon) and a view direction of the client 200. That is, the high/low angle data may be an angle that is formed by the horizontal plane and the view direction of the client 200 as the head of the user moves upwards and downwards.

The azimuth data is an angle that represents an azimuth, and may refer to an angle that is obtained as the head of the user rotates on the horizontal plane with respect to a specific reference direction. That is, the azimuth angle data may be changed by the motion of the head that rotates about the body (or neck) of the user.

The inclination data may refer to an angle that is obtained as the head of the user rotates about the front direction of the user. That is, the inclination data may be changed through a leftward/rightward motion of the user or an entire rotation of the body of the user.

Further, the client 200 may measure of a movement of the wearer. For example, because the user moves while wearing the client 200 when a virtual simulation drill or a game is performed, the client 200 may request an image frame that agrees with a location that is moved based on the measured movement degree of the user from the server 100. Further, as described later, when the user does not receive an image frame at a specific time point, the client 200 may correct an image frame by reflecting the movement degree of the user between the transmission cycles of the image frame.

Further, unless a specific image frame is received when an image frame is received through wireless communication, the client 200 may correct the image frame received previously such that the image frame is suitable for the motion of the user and display the corrected image frame on a screen. That is, unless a final image frame at a second time point is received, the client 200 may calculate a difference between the image direction data of the first time point and the reproduction direction data at the second time point and correct the final image frame at the first time point based on the difference. The second time point may be a time point after the transmission cycle of the final image frame from the first time point.

The server 100 and the client 200 may be connected to each other through wireless communication. The wireless communication scheme may include a Wi-Fi scheme or cellular communication. For example, when the server 100 is a computer disposed in a specific space (for example, the interior of a house or a virtual reality experience space) in which the user is located, the client 200 and the server 100 may communicate with each other through a wireless AP (for example, a Wi-Fi AP). Further, for example, when the server is a computer disposed at a remote distance on the outside, the remote server 100 may transmit the created image frame to the client 200 through cellular communication or LAN communication. The client 200 may receive the image frame from a base station through cellular communication or may receive the image frame through a WLAN from a wireless AP. Through this, if the user carries the client 200 that may perform wireless communication, the user may receive the VR image provided from the server 100 to use the VR image even though he or she is not located close to the server 100.

Hereinafter, a method for transmitting a virtual reality image, a method for reproducing a virtual reality image, and a program according to embodiments of the inventive concept will be described with reference to the accompanying drawings.

When a virtual reality image (VR image) is transmitted through wireless communication, a specific image frame may be omitted as the state of a wireless communication network is not smooth. In this case, the user may feel sick as if an object in the image frame was shaken. In order to solve the problem, it is necessary to create an alternative image frame that will replace the omitted image frame from the image frame received at a previous time point and provide the alternative image frame to the user.

While a separate reference for correction is not necessary because even correction of an image is performed by the server 100 that creates the image according to the existing scheme of connecting the server 100 and the client 200 are connected to each other by wire through a cable, a reference for connecting an image is necessary because the roles of the server 100 and the client 200 are divided such that the server 100 creates an image frame and the client 200 compensates for the omitted image frame at a specific time point according to the scheme of transmitting the image frame between the server 100 and the client 200 by using wireless communication. Accordingly, hereinafter, methods for creating and transmitting a virtual reality image by the server 100 and reproducing a virtual reality image by the client 200 to prevent the user from recognizing inconvenience of shaking feeling of an image by compensating for an image frame that is not received through wireless communication will be described.

Figure 2:
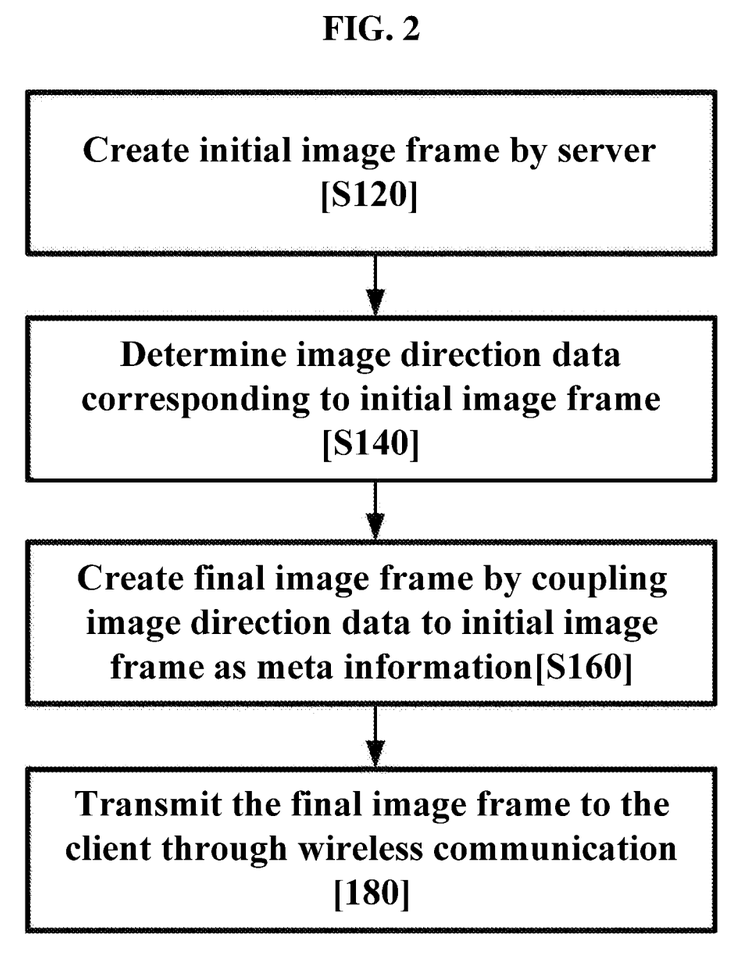
FIG. 2 is a flowchart illustrating a method for transmitting a virtual reality image according to an embodiment of the inventive concept.

FIG. 2 is a flowchart illustrating a method for transmitting a virtual reality image according to an embodiment of the inventive concept.

Referring to FIG. 2, the method for transmitting a virtual reality image according to an embodiment of the inventive concept includes an operation (S120) of creating an initial image frame by the server 100, an operation (S140) of determining image direction data corresponding to the initial image frame, an operation (S160) of creating a final image frame by coupling the image direction data to the initial image frame as meta information, and an operation (S180) of transmitting the final image frame to the client 200 through wireless communication.

The server 100 creates an initial image frame (S120). The server 100 may create the initial image frame by driving a program installed in the server 100. The initial image frame refers to an image frame on which, when a specific image frame is not received after the image frame is transmitted to the client 200, information processing for compensating for the failure of the reception of the image frame is not performed. For example, the server 100 may create a game image frame by driving a game program by the server 100.

The server 100 determines image direction data corresponding to the initial image frame (S140). The image direction data may be data on a direction in a 3-dimensional space of the image frame created by the server 100. The image direction data may be determined before an image is created by the server 100 (for example, after a direction of an image is determined as an image of a specific direction is requested, a corresponding initial image frame is created), and after the image frame is created, corresponding image direction data may be determined.

The server 100 creates a final image frame by coupling image direction data to the initial image frame as meta information (S160) Thereafter, the server 100 transmits the final image frame to the client 200 through wireless communication (S180). That is, the server 100 may transmit the final image frame obtained by coupling the image direction data to the initial image frame to the client 200 so that the client 200 may determine a direction corresponding to an image frame or, when an image frame of a next transmission time point (that is, a second time point) is not received, it may be compensated for through correction of an image frame of a previous time point (that is, a first time point).

That is, unless a final image frame at the second time point is received from the server 100 due to an inferiority of a communication state or the like, the client 200 may calculate a difference between the image direction data of the first time point and the reproduction direction data at the second time point and calculate the final image frame at the first time point based on the difference. The second time point may be a time point after the transmission cycle of the final image frame from the first time point.

Further, the method may further include an operation (S110) of receiving reproduction direction data from the client 200. For example, if the wearer moves while wearing the client 200, the client 200 may obtain data (for example, data on a motion of the head of the user) on a direction of an image frame that has to be provided to the user through a screen at a specific time point and transmit the obtained data to the server 100. The data measured by the client 200 is called reproduction direction data, and the server 100 may determine the image direction data based on the reproduction direction data received from the client 200 in the operation (S120) of determining the image direction data. That is, the server 100 may determine a direction that agrees with the reproduction direction data received from the client 200 as a direction in which an image is to be created. Accordingly, the server 100 may set the reproduction direction data received from the client 200 as image direction data (S120), and may create the initial image frame that agrees with the set image direction data (S100).

Further, the operation (S140) of creating the final image frame may further include an operation of converting the final image frame into image frames for the eyeballs. In order to provide a 3-dimensional image, an image for the left eye and an image for the right eye need to be different. Accordingly, the server 100 may convert the final image frame that is to be transmitted to the client 200 into a final image frame for the left eye and a final image frame for the right eye.

Further, the operation (S140) of creating the final image frame may further include an operation of converting the size of the final image frame to a size that agrees with the screen of the client 200. That is, the server 100 may convert the size of the image frame such that the size of the image frame agrees with the size of the screen of the client 200 such that the client 200 receives the final image frame and reproduce the received final image frame immediately. Through this, a time delay that may occur in a process of converting the size of the image frame to a size that agrees with the size of the screen of the client 200 of a low information processing specification as compared with the server 100 may be minimized.

Figure 3:
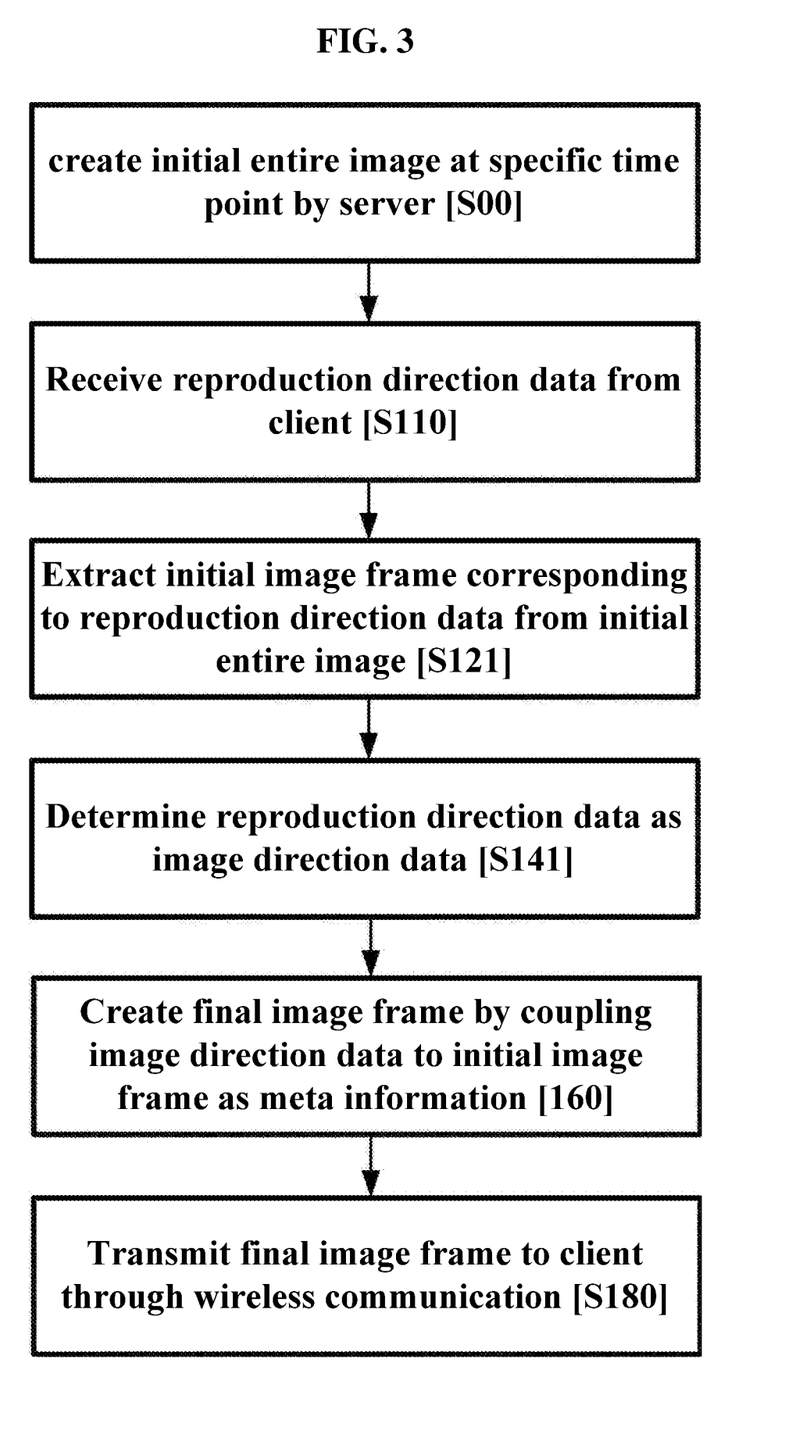
FIG. 3 is a flowchart illustrating a method for transmitting a virtual reality image frame created based on an initial entire image according to an embodiment of the inventive concept.

FIG. 3 is a flowchart illustrating a method for transmitting a virtual reality image frame created based on an initial entire image according to an embodiment of the inventive concept.

The method for transmitting a virtual reality image according to another embodiment of the inventive concept includes an operation (S100) of creating an initial entire image at a specific time point by the server 100, an operation (S110) of receiving reproduction direction data from the client 200, an operation (S121) of extracting an initial image frame corresponding the reproduction direction data from the initial entire image, an operation (S141) of determining the reproduction direction data as image direction data, an operation (S160) of creating a final image frame by coupling the image direction data to the initial image frame as meta information, and an operation (S180) of transmitting the final image frame to the client 200 through wireless communication. Hereinafter, a detailed description of the above-described operations will be omitted.

The server 100 obtains an initial entire image at a specific time point (S100). The initial entire image may refer to an image including image frames of all directions which the eyes of the user face. That is, the server 100 may create an entire image at a specific time point by driving a specific program therein, and may extract an entire image at a specific time point from entire images (for example, images captured for a specific period of time by a 360 degree camera) of a specific period of time, which are created in advance.

The server 100 receives reproduction direction data from the client 200 (S110).

The server 100 extracts an initial image frame corresponding to the reproduction direction data from the initial entire image (S121). That is, the server 100 may determine a direction in which an image frame is requested through the reproduction direction data received from the client 200, and may extract an initial image frame corresponding to the reproduction direction data from the initial entire image.

The server 100 determines the reproduction direction data as image direction data (S141). That is, the server 100 may set the reproduction direction data received from the client 200 as the image direction data of the extracted initial image frame because the extracted initial image frame is an image frame of a direction corresponding to the reproduction direction data.

The server 100 creates a final image frame by coupling the image direction data to the initial image frame as meta information (S160) The server 100 transmits the final image frame to the client 200 through wireless communication (S180).

Figure 4:
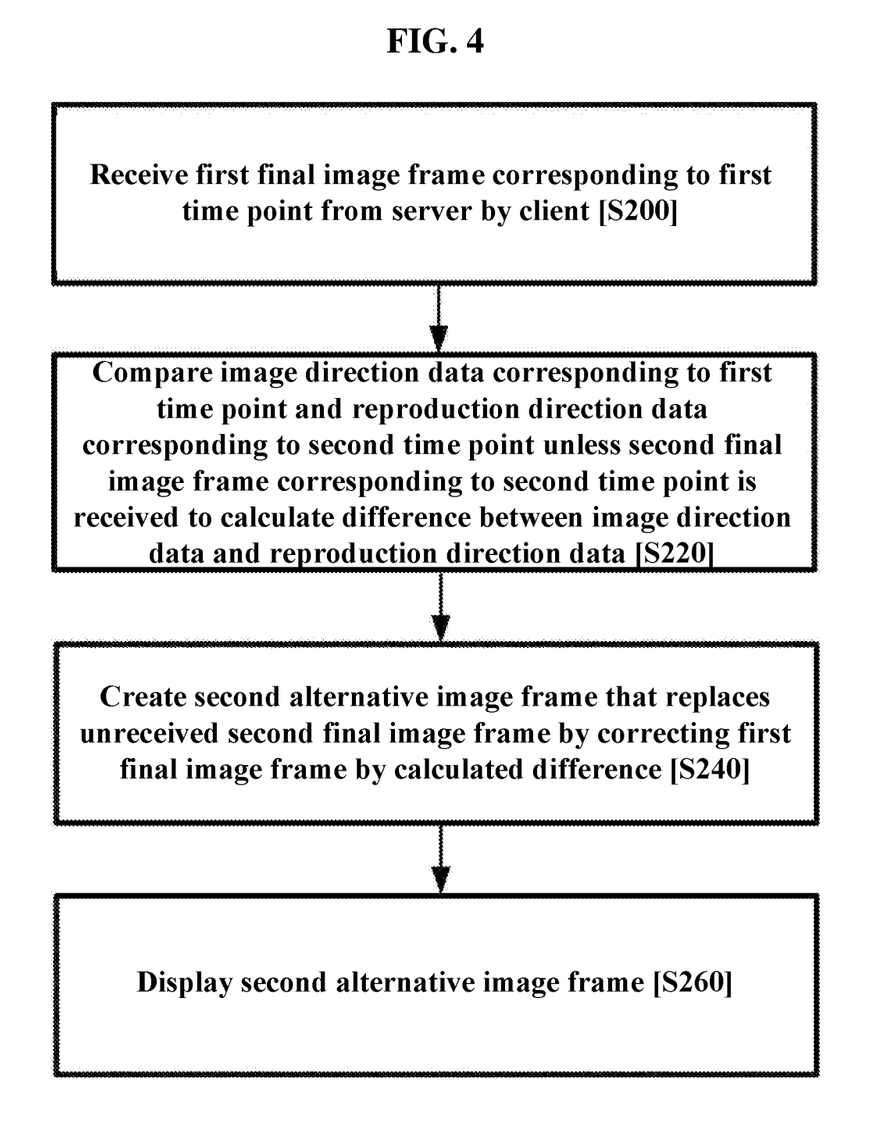
FIG. 4 is a flowchart illustrating a method for reproducing a virtual reality image by a client according to an embodiment of the inventive concept.

FIG. 4 is a flowchart illustrating a method for reproducing a virtual reality image by a client 200 according to an embodiment of the inventive concept.

The method for reproducing an virtual reality image according to another embodiment of the inventive concept includes an operation (S200) of receiving a first final image frame corresponding to a first time point from the server 100 by the client 200, an operation (S220) of, unless a second final image frame corresponding to a second time point is received, comparing image direction data corresponding to the first time point and reproduction direction data corresponding to the second time point to calculate a difference between the image direction data and the reproduction direction data, an operation (S240) of creating a second alternative image frame that replaces the unreceived second final image frame by correcting the first final image frame by the calculated difference, and an operation (S260) of displaying the second alternative image frame on a screen.

The client 200 receives a first final image frame corresponding to a first time point from the server 100 (S200). That is, the client 200 may receive the first final image frame to which image direction data is coupled as meta information from the server 100 through wireless communication. The image direction data is data on a direction in a 3-dimensional space of the image frame obtained by the server 100, and the final image fame may be an image frame including the image direction data as meta information by the server 100.

Figure 5:
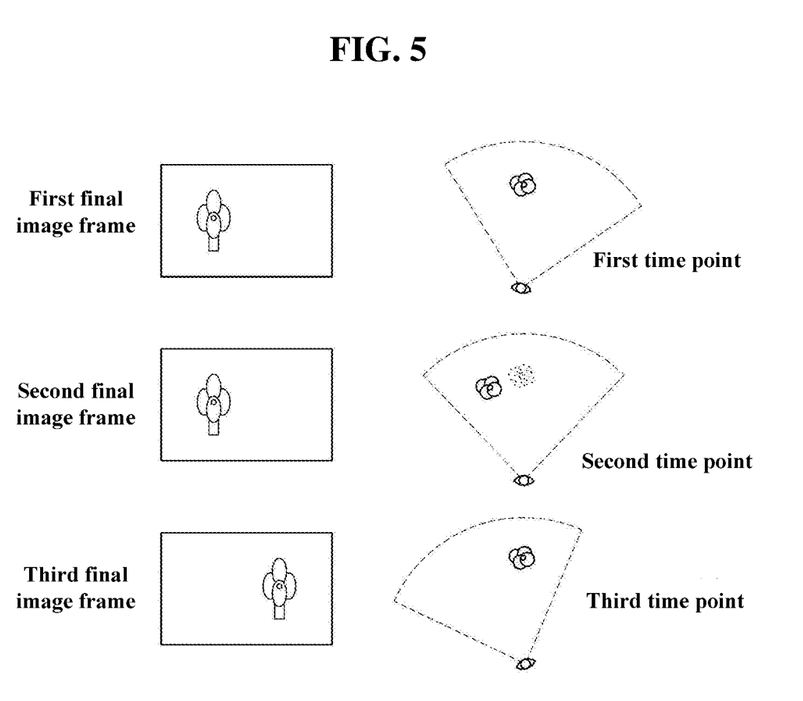
FIG. 5 is an exemplary view illustrating a change of an image provided to the user through a client when a second final image frame is omitted and a second alternative image frame is not provided.

Unless a second final image frame corresponding to a second time point is received, the client 200 compares image direction data corresponding to the first time point and reproduction direction data corresponding to the second time point and calculating a difference between the image direction data and the reproduction direction data (S220). The second time point may be a time point after the transmission cycle of the final image frame from the first time point. The client 200 may not receive a second final image frame due to an inferiority of a communication state at a second time point after lapse of a transmission cycle of the final image frame after receiving and displaying the first final image frame corresponding to the first time point. In this case, the user may feel an object shaken by the difference between the reproduction direction data at the second time point and the image direction data of the first final image frame as the first final image frame is continuously displayed instead of the second final image frame expected at the second time point. That is, if a new final image frame (that is, a third final image frame) is received at a third time point (a time point after a transmission cycle of the final image frame from the second time point) after the first final image frame corresponding to the first time point is continuously displayed at the second time point, the user may feel as if an object was unnaturally moved or shaken because a location of the object corresponding to the second time point is skipped and a location of the object at the first time point is moved to a location of the object at the third time point as the first final image frame is immediately changed to the third final image frame as illustrated in FIG. 5. If the phenomenon continues, the user may feel sick. In order to solve the problem, the client 200 needs to create an image frame that will replace the omitted second final image frame. Accordingly, the client 200 may create an image frame (that is, a second alternative image frame) at the second time point by correcting the first final image frame received at the first time point.

The client 200 needs to determine a level of correction to convert the first final image frame to an image frame that agrees with the second time point. To achieve this, the client 200 may compare the image direction data corresponding to the first time point and the reproduction direction data corresponding to the second time point to calculate a difference between the image direction data and the reproduction direction data. The reproduction direction data may be data on a direction of an image frame that is to be reproduced on a screen of the client 200 at a specific time point. The reproduction direction data may be measured through a sensor (for example, a gyro sensor, a geomagnetic sensor, or an acceleration sensor) provided in the VR device. For example, when the client 200 receives an image frame including image direction data corresponding to the reproduction direction data from the server 100 and provides the received image frame to the user, the client 200 may calculate a difference between second reproduction direction data corresponding to a direction in which the image frame is to be provided and first image direction data corresponding to a direction of the first final image frame to determine the difference as a value by which the first final image frame has to be corrected.

The reproduction direction data and the image direction data may include high/low angle data and azimuth angle data. The client 200 may calculate differences between high/low angles and azimuth angles of the reproduction direction data at the second time point and the image direction data at the first time point.

Further, the reproduction direction data and the image direction data may include inclination data that corresponds to a rotation angle about a front direction of a wearer. The client 200 may calculate differences between inclination data of the reproduction direction data at the second time point and the image direction data at the first time point.

The client 200 creates a second alternative image frame that replaces the second final image frame, which has not been received, by correcting the first final image frame by the calculated difference (S240). As an embodiment, the client 200 may move the first final image frame based on the difference. That is, the client 200 may move the first final image frame vertically by the difference between the high/low angles, and may move the first final image frame horizontally by the difference between the azimuth angles. Further, the client 200 may rotate the first final image frame by the difference between the inclination data. Because the object viewed to the user rotates if the head of the user is inclined to a specific direction about the front direction, the first final image frame may rotate by the difference between the image direction data at the first time point and the reproduction direction data at the second time point.

Figure 6:
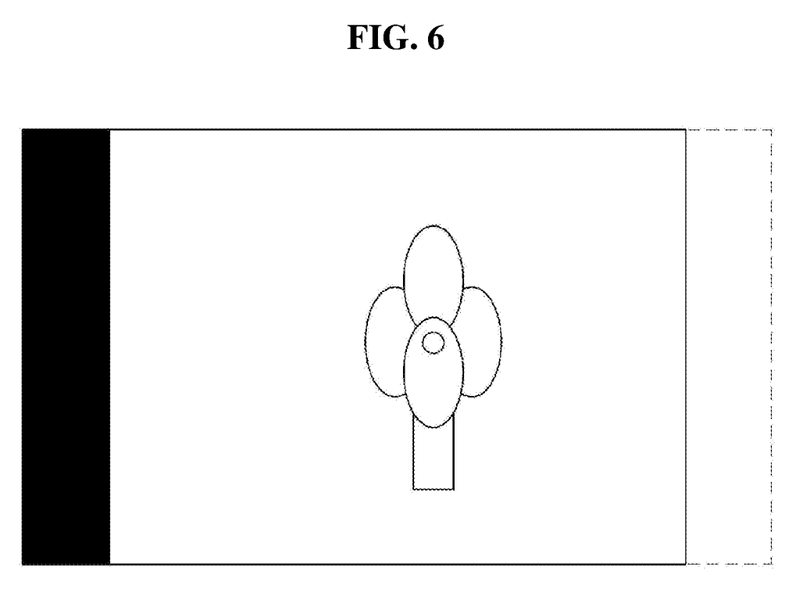
FIG. 6 is an exemplary view of a second alternative image frame created based on a difference between image direction data at a first time point and reproduction direction data at a second time point by a client according an embodiment of the inventive concept.

When the client 200 corrects the first final image frame according to the difference, a marginal area is generated on the second alternative image frame that is to be provided to the user as illustrated in FIG. 6. The marginal area may be processed in black and white, or may be processed with a combination of similar colors such that the wearer may minimally recognize the marginal area visually.

The client 200 displays the second alternative image frame on the screen (S260). That is, the client 200 may display the second alternative image frame obtained by correcting the first image frame instead of the second final image frame omitted at the second time point.

Figure 7:
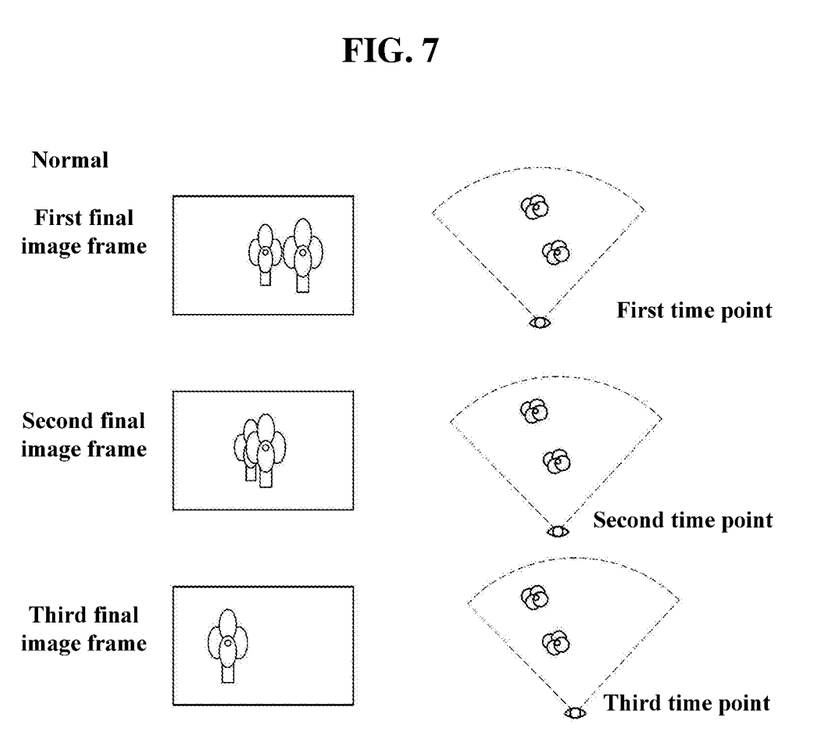
FIG. 7 is an exemplary view illustrating that a location of an object changes as frames are sequentially provided while a final image frame is not omitted when a client moves.
Figure 8:
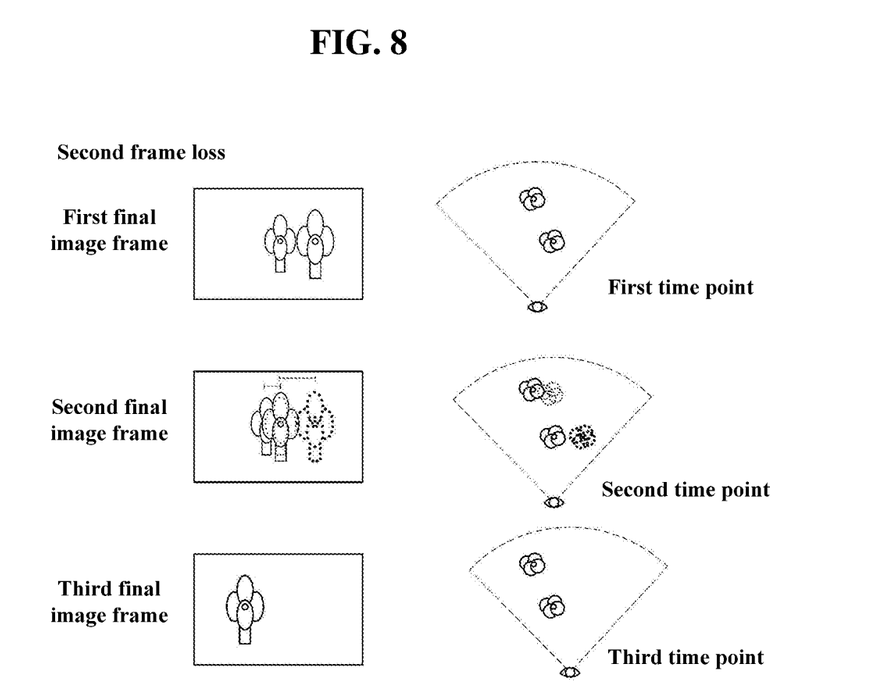
FIG. 8 is an exemplary view illustrating that a second alternative image frame obtained by correcting locations of objects in a first final image frame while a movement degree of a client is reflected according to an embodiment of the inventive concept.

Further, when the user moves while wearing the client 200, the client 200 may recognize a movement degree (for example, a movement distance and a movement direction or the number of moving steps) of the user and may correct the first final image frame such that the first final image frame agrees with the movement degree of the user when the final image frame at the second time point is not received. As an embodiment, when the user moves, degrees of change of locations of the objects are different according to the distances by which the objects are spaced apart from the user. As illustrated in FIG. 7, a close object moves by a large width as the user moves, and a distance object moves by a small width as compared with a close object as the user moves. Accordingly, a high reality feeling may be provided to the user by reflecting a difference between the movement widths of the objects according to the perspective even in the virtual reality image. To achieve this, the server may create a final image frame while the final image frame includes distance information (hereinafter, depth information) by which a plurality of objects (that is, objects expressed with a set of pixels in the image frame) are spaced apart from the client as meta information and transmit the created final image frame. When the second final image frame at the second time point is omitted, the client may calculate a movement degree of the user by using one or more sensors (for example, a gyro sensor, an acceleration sensor, and a geomagnetic sensor), and may create a second alternative image frame by reflecting the depth information of the objects on the objects in the first final image frame. That is, as illustrated in FIG. 8, the client may create the second alternative image frame by performing correction for respective pixels corresponding to the plurality of objects in the first final image frame according to the difference between the locations (that is, the locations of the user who wears the client) at the first time point and the second time point. Further, additionally, the client may correct an area of the first final image frame in which an object is disposed before after correcting the object in unit of pixels by reflecting a difference between the movement widths of the object according to the distance at which the object is disposed. The client may fill an existing object disposition space through combination of specific colors by reflecting the surrounding colors.

Further, as another embodiment, when the movement widths of the object are different, the client may move the image frame according to the disposition location of an object having the largest size and then may adjust the remaining objects in unit of pixels. Through this, because a pixel unit operation is not performed for the object having the maximum size, an empty space generated due to the pixel unit movements in the second alternative image frame may be minimized. Further, as another embodiment, when the user who wears the client moves only forwards or rearwards, the client may generate a second alternative image frame that replaces the omitted second final image frame by enlarging or reducing the first final image frame.

Further, the method may further include an operation of comparing image direction data corresponding to the (n−1)-th time point (n is a natural number that is greater than 2) and reproduction direction data corresponding to the n-th time point if a final image frame corresponding to the n-th time point to calculate a difference between the image direction data and the reproduction direction data, and an operation of correcting the (n−1)-th alternative image frame by the calculated difference to create the n-th alternative image frame. That is, if the second final image frame is not received at the second time point and a third final image frame is received at a third time point after the second alternative image frame is provided, the user may feel as if an object in the image moved smoothly. However, when the image frame is not continuously received even after the second time point, the client 200 needs to create a next alternative image frame (for example, a third alternative image frame or an n-th alternative image frame) based on an alternative image frame (for example, the second alternative image frame or an (n−1)-th alternative image frame) created previously. The client 200 may compare image direction data (or the reproduction direction data measured at the (n−1)-th time point in the (n−1)-th alternative image frame at the (n−1)-th time point and reproduction direction data measured at the n-th time point to calculate a difference between the image direction data and the reproduction direction data, and may calculate an n-th alternative image frame by correcting (for example, moving or converting) the (n−1)_th alternative image frame by the calculated difference. Through this, the client 200 may provide the user with a natural virtual reality image even when a final image frame is not continuously received from the server 100 due to an inferiority of a communication state.

The methods for transmitting and correcting a virtual reality image according to an embodiment of the inventive concept may be realized by a program (or an application) to be coupled to the server 100 or the client 200 that is a piece of hardware and may be stored in a medium.

The program may include a code that is coded in a computer language, such as C, C++, JAVA, or a machine language, by which a processor of the computer may be read through a device interface of the computer, to execute the methods implemented by a program after the computer reads the program. The code may include a functional code related to a function that defines necessary functions that execute the methods, and the functions may include an execution procedure related control code necessary to execute the functions in its procedures by the processor of the computer.

Further, the code may further include additional information that is necessary to execute the functions by the processor of the computer or a memory reference related code on at which location (address) of an internal or external memory of the computer should be referenced by the media. Further, when the processor of the computer is required to perform communication with another computer or server in a remote site to allow the processor of the computer to execute the functions, the code may further include a communication related code on how the processor of the computer executes communication with another computer or server or which information or medium should be transmitted and received during communication by using a communication module of the computer.

The stored medium refers not to a medium, such as a register, a cash, or a memory, which stores data for a short time but to a medium that stores data semi-permanently and is read by a device. In detail, an example, of the stored medium may include a ROM, a RAM, a CD-ROM, a magnetic tape, a floppy disk, and an optical data storage device, but the inventive concept is not limited thereto. That is, the program may be stored in various recording media on various servers, which the computer may access, or in various recording media on the computer of the user. Further, the media may be dispersed in a computer system connected to the medium through a network, and codes that may be read by the computer in a dispersion manner may be stored.

The inventive concept has the following effects.

First, because omission of an image frame at a specific time point due to wireless transmission of a virtual reality image frame may be compensated for, the user may naturally maintain an overall time point of the virtual reality space while the overall time point is not shaken even when a specific image frame is not received.

Second, a virtual reality image without breaks may be enjoyed at anywhere by using cellular communication or WLAN communication even when a server computer is distant from the user.

Third, because a virtual reality image may be transmitted wirelessly as a failure of reception of an image frame may be compensated for, a problem of restricting an action of the user by a cable connected to a computer and causing a safety accident due to the cable may be solved.

Fourth, because the server has only to extract only one frame of an entire image that agrees with reproduction direction data requested by the client or to generate only a frame in a direction that agrees with reproduction direction data to transmit the frame, a bandwidth of a network of wireless communication may be saved.

Fifth, because only one frame is transmitted instead of transmitting an entire image for all directions with the same data capacity, an image of a high resolution may be transmitted while a lot of communication traffics are not occupied. Through this, the user who wears the client may watch an image of a high resolution from a long distance.

Sixth, because the client receives only an image frame of a direction in which reproduction of an image is required by the server, a process of extracting a frame of a direction in which the image is reproduced from an entire image by the client is not necessary. Through this, the client may not be required to have a high specification.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A method for transmitting a virtual reality image, the method comprising:
    generating, by a server, an initial image frame;
    determining, by the server, image direction data on a direction in a virtual 3-dimensional space of the generated initial image frame;
    creating a first final image frame configured to be displayed at a first time point, by coupling the image direction data to the initial image frame as meta information;
    transmitting the first final image frame to a client through wireless communication, wherein the client is a device that reproduces the first final image frame corresponding to the virtual reality image;
    displaying, by the client, the first final image frame at the first time point;
    detecting, by the client, whether a second final image frame configured to be displayed at a second time point is received at the client, wherein the second time point is a time point after a transmission cycle from the first time point;
    when the second final image frame is received at the client, displaying, by the client, the second final image frame at the second time point; and
    only when the second final image frame is not received at the client, performing:
        calculating, by the client, a difference value between the image direction data, which is determined by the server based on the direction in the virtual 3-dimensional space of the initial image frame generated by the server, and reproduction direction data, which is generated by the client based on sensing data acquired by the client at the second time point;
        correcting, by the client, the first final image frame based on the calculated difference value, to generate a corrected image frame, wherein the corrected image frame includes a marginal area that is generated due to a movement of the first final image based on the calculated difference value; and
        displaying, by the client, the corrected image frame, wherein the marginal area is displayed as a black color area or a white color area.

2. The method of claim 1, further comprising:
    receiving reproduction direction data from the client,
    wherein the image direction data is determined based on the received reproduction direction data in the determining of the image direction data,
    wherein the client obtains the reproduction direction data by measuring a motion of the head of a user, and
    wherein the reproduction direction data is data on a direction of a reproducing image frame configured to be reproduced on a screen of the client at a specific time point.

3. The method of claim 1, wherein the creating of the first final image frame includes:
    converting the first final image frame into image frames for respective eyeballs; and
    converting a size of the first final image frame to a size that agrees with a screen of the client.

4. A non-transitory computer-readable recording medium storing a program for transmitting a virtual reality image, and configured to be coupled to a computer being hardware, the program including instructions to execute the method of claim 1.

5. The method of claim 1, wherein the detecting comprises:
 detecting, by the client, whether the second final image frame is received at the client or the second final image frame is not received at the client due to a network error.

6. A method for transmitting a virtual reality image, the method comprising:
 generating, by a server, an initial entire image configured to be displayed at a first specific time point;
 receiving, by the server, from a client, first reproduction direction data generated by the client based on sensing data acquired by the client at the first specific time point;
 extracting, by the server, an initial image frame corresponding to the first reproduction direction data from the initial entire image;
 determining, by the server, image direction data on a direction in a virtual 3-dimensional space of the initial image frame, based on the first reproduction direction data, and generating, by the server, a first final image frame by coupling the image direction data to the initial image frame as meta information; and
 transmitting, by the server, the first final image frame to the client through wireless communication, wherein the client is a device that generates the first reproduction direction data by measuring a motion of the head of a user at the first specific time point, and reproduces the first final image frame corresponding to the virtual reality image,
 displaying, by the client, the first final image frame at a first time point;
 detecting, by the client, whether a second final image frame configured to be displayed at a second time point is received at the client, wherein the second time point is a time point after a transmission cycle from the first time point;
 when the second final image frame is received at the client, displaying, by the client, the second final image frame at the second time point; and
 only when the second final image frame is not received at the client, performing:
  calculating, by the client, a difference value between the image direction data, which is determined by the server correspondingly to the direction in the virtual 3-dimensional space of the initial image frame extracted by the server, and second reproduction direction data, which is generated by the client based on sensing data acquired by the client at the second time point;
  correcting, by the client, the first final image frame based on the calculated difference value, wherein the corrected image frame includes a marginal area that is generated due to a movement of the first final image based on the calculated difference value; and
  displaying, by the client the corrected image frame, wherein the marginal area is displayed as a black color area or a white color area.

7. The method of claim 6, wherein the creating of the first final image frame includes:
 converting the first final image frame into image frames for respective eyeballs; and
 converting a size of the first final image frame to a size that agrees with a screen of the client.

8. The method of claim 6, wherein the detecting comprises:
 detecting, by the client, whether the second final image frame is received at the client or the second final image frame is not received at the client due to a network error.

* * * * *